United States Patent
Hill et al.

(10) Patent No.: US 11,766,702 B2
(45) Date of Patent: Sep. 26, 2023

(54) SPRAY NOZZLE, SYSTEMS, AND METHODS FOR CLEANING OPTICAL FIBER CONNECTORS

(71) Applicant: CORNING RESEARCH & DEVELOPMENT CORPORATION, Charlotte, NC (US)

(72) Inventors: Keith Mitchell Hill, Horseheads, NY (US); Eric Stephan ten Have, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/126,519

(22) Filed: Dec. 18, 2020

(65) Prior Publication Data

US 2021/0101167 A1    Apr. 8, 2021

Related U.S. Application Data

(63) Continuation of application No. PCT/US2019/037620, filed on Jun. 18, 2019.
(Continued)

(51) Int. Cl.
*B08B 3/02* (2006.01)
*B05B 14/30* (2018.01)
(Continued)

(52) U.S. Cl.
CPC .............. *B08B 3/02* (2013.01); *B05B 7/2494* (2013.01); *B05B 14/30* (2018.02); *B08B 3/04* (2013.01);
(Continued)

(58) Field of Classification Search
None
See application file for complete search history.

(56) References Cited

U.S. PATENT DOCUMENTS

| 4,733,428 A | 3/1988 | Malinge et al. |
| 5,616,184 A * | 4/1997 | Duncan ............... B29D 11/023 134/169 R |

(Continued)

FOREIGN PATENT DOCUMENTS

EP    2817499 B1    4/2016

OTHER PUBLICATIONS

International Search Report and Written Opinion of the International Searching Authority; PCT/US19/037620; dated Aug. 28, 2019; 8 Pages; European Patent Office.

*Primary Examiner* — Mikhail Kornakov
*Assistant Examiner* — Ryan L Coleman

(57) ABSTRACT

A spray nozzle, systems and methods for cleaning at least one optical fiber end face of an optical fiber connector. The nozzle includes a housing body with a first end portion and a second end portion. A discharge passage carries an atomized mixture of cleaning fluid and positively pressurized air from the first end portion to a discharge opening at the second end portion. A vacuum return passage communicates with the discharge passage proximate the second end portion. The return passage receives the atomized mixture of cleaning fluid and positively pressurized air as well as contaminants removed from the optical fiber end face. A portion of the atomized mixture of cleaning fluid and positively pressurized air is diverted from the discharge passage to control the amount of the atomized mixture being directed at the optical fiber end face.

23 Claims, 6 Drawing Sheets

Related U.S. Application Data

(60) Provisional application No. 62/692,650, filed on Jun. 29, 2018.

(51) Int. Cl.
*B05B 7/24* (2006.01)
*B08B 3/04* (2006.01)
*B08B 5/02* (2006.01)
*G02B 6/38* (2006.01)

(52) U.S. Cl.
CPC .............. *B08B 5/02* (2013.01); *G02B 6/3866* (2013.01); *B08B 2203/0229* (2013.01); *B08B 2240/02* (2013.01)

(56) References Cited

U.S. PATENT DOCUMENTS

| | | |
|---|---|---|
| 6,042,089 A | 3/2000 | Klein |
| 7,566,176 B2 | 7/2009 | Lytle et al. |
| 9,891,389 B1 | 2/2018 | Fredell et al. |
| 2004/0033050 A1* | 2/2004 | Lytle .................... G02B 6/3807 385/147 |
| 2008/0152284 A1 | 6/2008 | Lytle et al. |
| 2015/0007572 A1 | 1/2015 | Pousseo et al. |

\* cited by examiner

SPRAY NOZZLE, SYSTEMS, AND METHODS FOR CLEANING OPTICAL FIBER CONNECTORS

PRIORITY APPLICATIONS

This application is a continuation of International Application No. PCT/US19/37620, filed on Jun. 18, 2019, which claims the benefit of priority to U.S. Application No. 62/692,650, filed on Jun. 29, 2018, both applications being incorporated herein by reference.

FIELD

The present disclosure relates to optical fiber connectors and in particular to spray nozzles, systems, and methods for cleaning optical fiber connectors.

BACKGROUND

Optical fiber connectors are used to optically couple at least two optical fibers. To this end, an optical fiber connector supports an end portion of at least one optical fiber. The end portion of each optical fiber has a polished end face. When two optical fiber connectors are operably engaged, the end faces of the corresponding optical fibers are placed in close proximity (typically in contact) and in a confronting orientation to facilitate the communication of light from one fiber to the other through the optical fiber end faces.

The optical fiber end faces need to be kept clean to ensure optimum optical transmission and to avoid damage to the optical fibers when the optical fibers are placed into close proximity using optical fiber connectors. Conditions in the nozzle, such as distribution of pressure and temperature of the atomized air/cleaning fluid mixture, are determined by the geometry of the nozzle, the amount of air directed through the nozzle, and the operating setpoints of the cleaning fluid flow (i.e., positive air pressure, vacuum pressure, cleaning fluid pressure, etc.). While the setpoints may be set independently within certain limits by the user, the amount of air delivered by the cleaning nozzle and the shape of the cleaning nozzle are fixed.

SUMMARY

This disclosure provides embodiments of a spray nozzle for cleaning at least one optical fiber end face with a mixture of cleaning fluid and positively pressurized air. The spray nozzle is configured to be coupled to an optical fiber connector that supports the at least one optical fiber end face. According to one embodiment, the spray nozzle comprises a housing body having a first end portion and a second end portion, a discharge passage for carrying the mixture from the first end portion to a discharge opening in the second end portion, and a return passage extending at least partially in the second end portion. The return passage is configured to communicate with the discharge passage along a first fluid flow path proximate the second end portion for receiving the mixture after the mixture passes through the discharge opening. Additionally, the return passage is configured to communicate with the discharge passage along a second fluid flow path proximate the first end portion for diverting a portion of the mixture from the discharge passage and thereby control an amount of the mixture being directed to the discharge opening.

In some embodiments, the housing body further comprises an inner housing member at least partially defining the discharge passage, and an outer housing member adjacent the inner housing member and at least partially defining the return passage.

Additionally, in some embodiments, the second fluid flow path is adjustable to allow the amount of the mixture diverted through the second fluid flow path to be changed and thereby further control the amount of positively pressurized air being directed to the discharge opening.

This disclosure also provides embodiments of a system for cleaning at least one optical fiber end face with a mixture of positively pressurized air and a cleaning fluid. The system is configured to be coupled to an optical fiber connector that supports the at least one optical fiber end face.

According to one embodiment, the system comprises a housing body having a first end portion and a second end portion, a discharge passage for carrying the mixture from the first end portion to a discharge opening in the second end portion, and a return passage extending at least partially in the second end portion. The system also comprises a manifold coupled to the first end portion of the housing body. The return passage is configured to communicate with the discharge passage along a first fluid flow path proximate the second end portion for receiving the mixture after the mixture passes through the discharge opening. Additionally, the return passage is configured to communicate with the discharge passage along a second fluid flow path defined by a gap between the manifold and the housing body for diverting a portion of the mixture from the discharge passage and thereby control an amount of the mixture being carried by the discharge passage.

In some embodiments of the system the housing body includes a tapered surface, the manifold includes a complementary tapered surface confronting the tapered surface of the housing body, and the gap is formed between the tapered surface of the housing body and the complementary tapered surface of the manifold. A distance between the tapered surface of the housing body and the complementary tapered surface of the manifold may be adjustable to vary the size of the gap.

According to another embodiment, the system comprises a spray nozzle that includes: a housing body having a first end portion and a second end portion, a discharge passage for carrying the mixture from the first end portion to a discharge opening in the second end portion, and a return passage extending at least partially in the second end portion; and a spray nozzle coupling element at the first end portion. The system also comprises a manifold that includes: a manifold coupling element configured to mate with the spray nozzle coupling element at the first end portion of the housing body, an air supply passage adapted to be coupled to a source of positively pressurized air, the supply passage communicating with the discharge passage of the housing body, and a vacuum passage adapted to be coupled to a source of vacuum pressure and communicating with the return passage of the housing body. The return passage of the housing body is configured to communicate with the discharge passage along a first fluid flow path proximate the second end portion for receiving the mixture after the mixture passes through the discharge opening. Additionally, the return passage of the housing body is configured to communicate with the discharge passage along a second fluid flow path proximate the first end portion for diverting a portion of the mixture from the air supply passage of the manifold to the vacuum passage and thereby control an amount of the mixture being directed to the discharge opening.

In some embodiments, the second fluid flow path is adjustable to allow the amount of the mixture diverted through the second fluid flow path to be changed and thereby further control the amount of the mixture being directed to the discharge opening.

Methods of removing contaminants from at least one optical fiber end face supported by an optical fiber connector using a spray nozzle are disclosed, wherein the spray nozzle has first and second end portions. One example of such a method comprises: coupling the optical fiber connector to the second end portion of the spray nozzle such that the at least one optical fiber end face confronts a discharge opening of the nozzle that is in the second end portion; directing a mixture of cleaning fluid and positively pressurized air through a discharge passage of the spray nozzle and at the at least one optical fiber end face, wherein the discharge passage carries the mixture from the first end portion to the discharge opening in the second end portion; removing contaminants from the optical fiber end face with the; mixture after the mixture passes through the discharge opening; directing the mixture and removed contaminants proximate the second end portion into a return passage in the spray nozzle; and providing fluid communication between the discharge passage and the return passage proximate the first end portion to divert a portion of the mixture from the discharge passage into the return passage and thereby control an amount of the mixture being directed to the discharge opening.

In some embodiments, the method further comprises adjusting the amount of the mixture diverted from the discharge passage to further control the amount of the mixture being directed at the optical fiber end face.

Various additional features and advantages of the disclosure will become more apparent to those of ordinary skill in the art upon review of the following detailed description of the illustrative embodiments taken in conjunction with the accompanying drawings.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
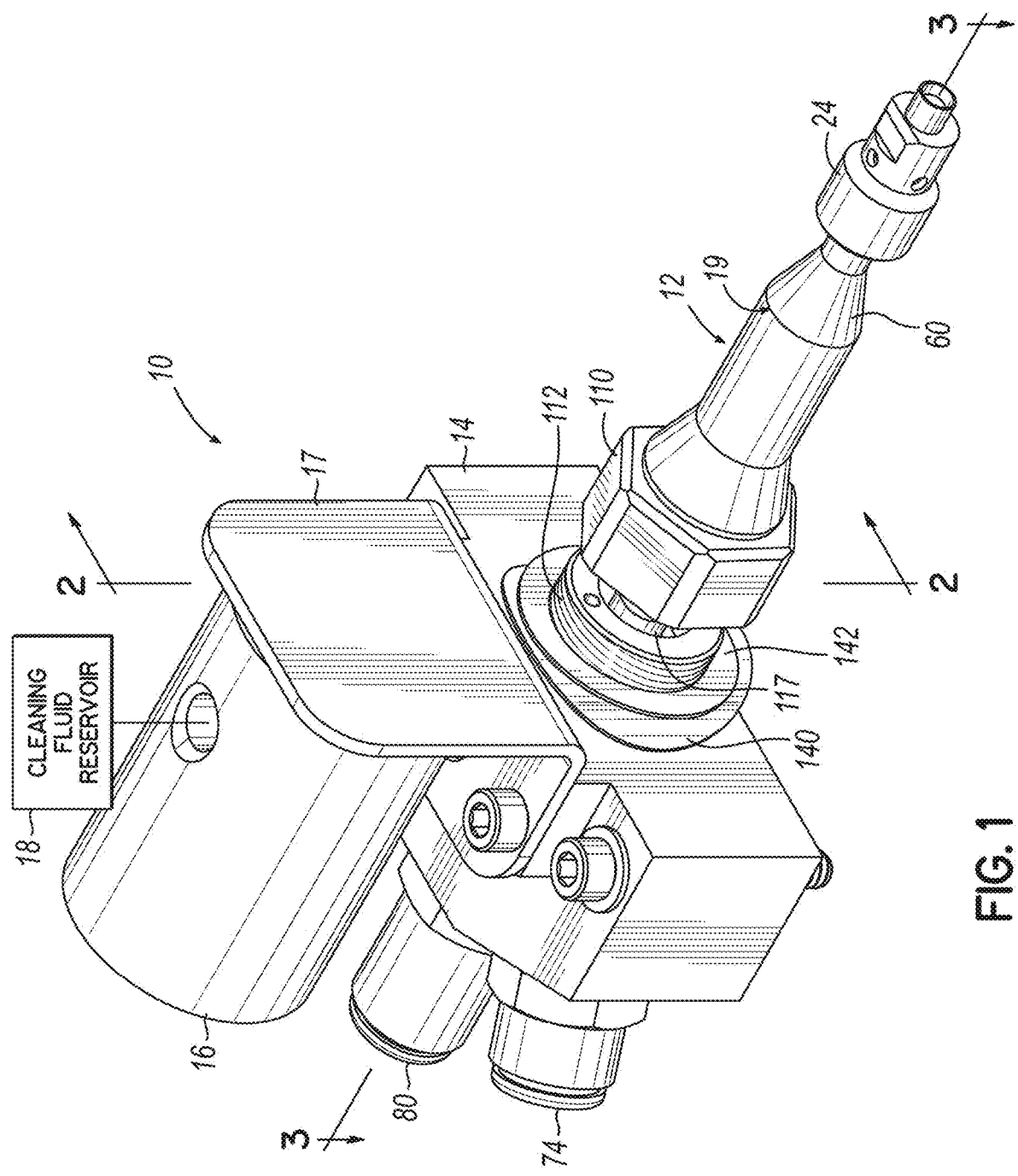
FIG. 1 is a perspective view of an optical fiber cleaning system constructed in accordance with one illustrative example of the present disclosure, and including an illustrative example of a spray nozzle constructed in accordance with the disclosure.
Figure 2:
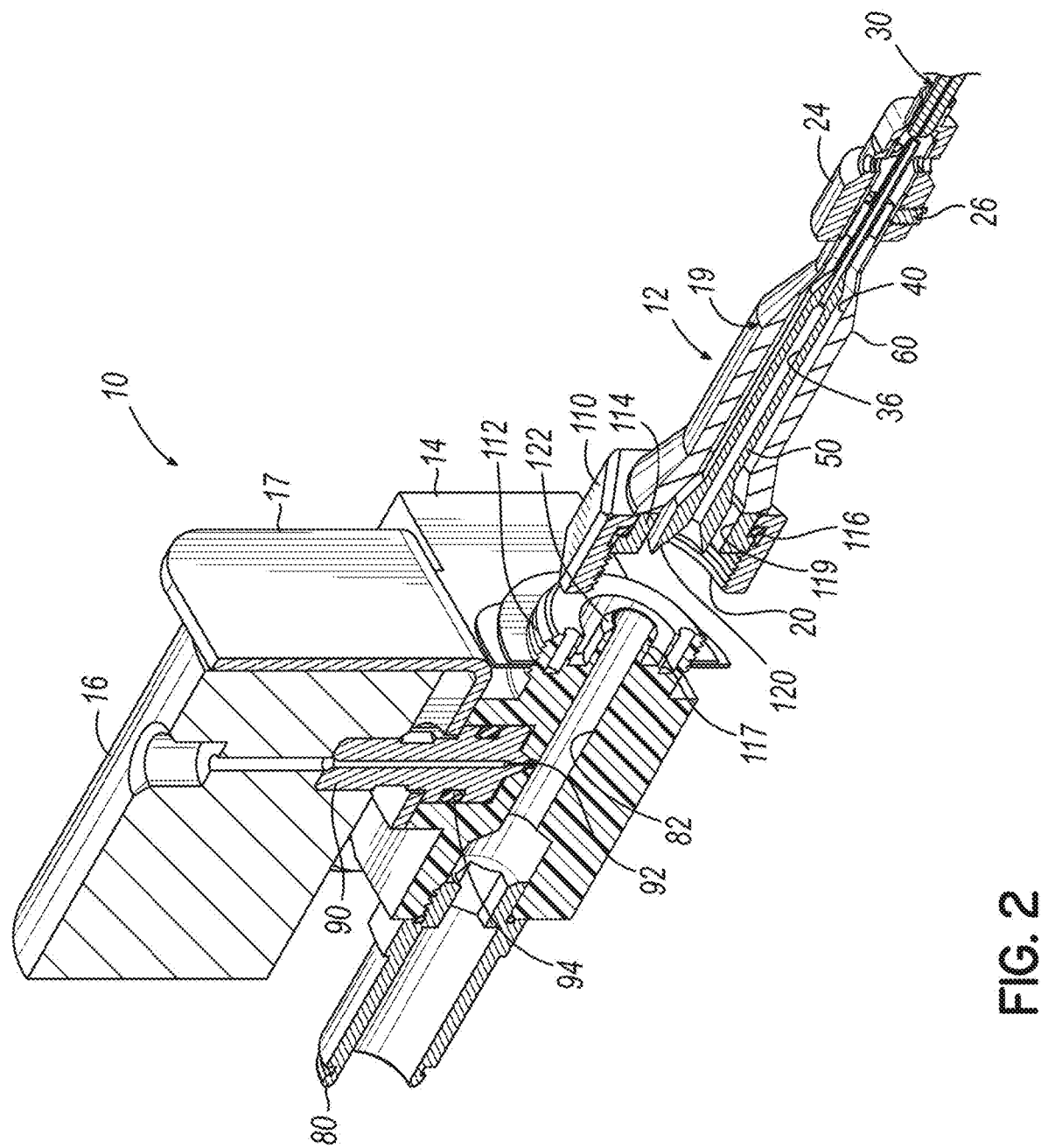
FIG. 2 is a cross sectional view taken along line 2-2 of FIG. 1, but additionally includes a portion of an exemplary optical fiber connector being coupled to the spray nozzle by a nozzle adapter of the cleaning system.
Figure 2A:
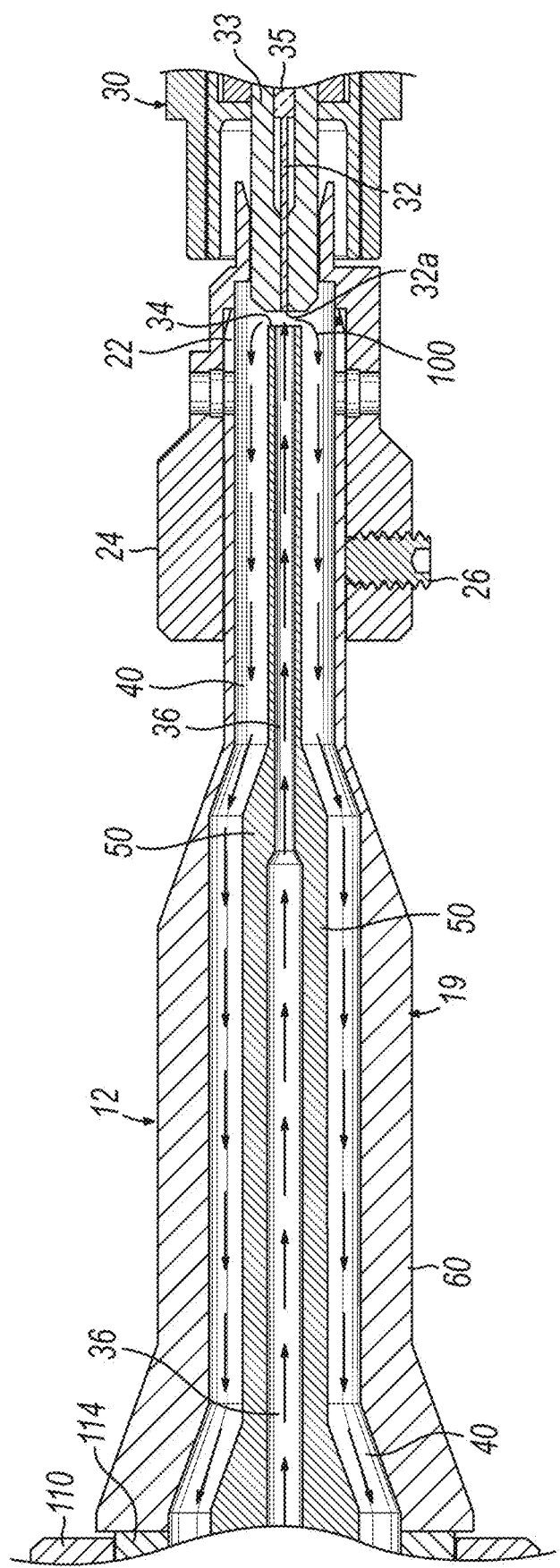
FIG. 2A is an enlarged cross sectional view showing a discharge end portion of the spray nozzle, the nozzle adapter, and a portion of the optical fiber connector.

Referring to FIGS. 1, 2, 2A and 3, an optical fiber connector cleaning system 10 ("cleaning system 10") is illustrated and generally includes a spray nozzle 12 ("nozzle 12"), a fluid manifold 14 ("manifold 14"), a cleaning fluid valve 16 ("valve 16"), and a cleaning fluid reservoir 18 ("reservoir 18") for supplying pressurized cleaning fluid to the valve 16. The valve 16 is fixed to the manifold 14 by a bracket 17. The nozzle 12 generally comprises a housing body 19 having a first end portion 20 (FIG. 2) and a second end portion 22 (FIG. 2A). The first and second end portions 20, 22 may alternatively be referred to as inlet and discharge end portions, respectively, for reasons that will be apparent based on the description below.

As shown best in FIG. 2A, in the illustrative embodiment the nozzle 12 further comprises a nozzle adapter 24 fixed to the discharge end portion 22 of the housing body 19 using one or more suitable fasteners 26. In other embodiments the nozzle 12 may not need an adapter 24 at or proximate to the discharge end portion 22 and instead be configured to couple directly with one or more types of optical fiber connectors.

A portion of a representative optical fiber connector 30 is further shown in FIGS. 2 and 2A coupled to the nozzle adapter 24. The optical fiber connector 30 may be any type of connector, including those having single or multiple optical fibers. Upon connection of the nozzle adapter 24 to the optical fiber connector 30, an end face 32a of an optical fiber 32 that is terminated by the optical fiber connector 30 directly confronts a discharge opening 34 of a discharge passage 36 in the spray nozzle 12 (FIG. 2A). The optical fiber 32 is fixed within a ferrule 33 of the optical fiber connector 30, such as in any conventional configuration. As will be detailed further below, the discharge passage 36 of the spray nozzle 12 directs a positively pressurized mixture of air and cleaning fluid to the optical fiber end face 32a. The cleaning fluid in the reservoir 18 (FIG. 1) may comprise any suitable gas or any suitable liquid, or a combination of gas and liquid suitable for the purpose.

Figure 3:
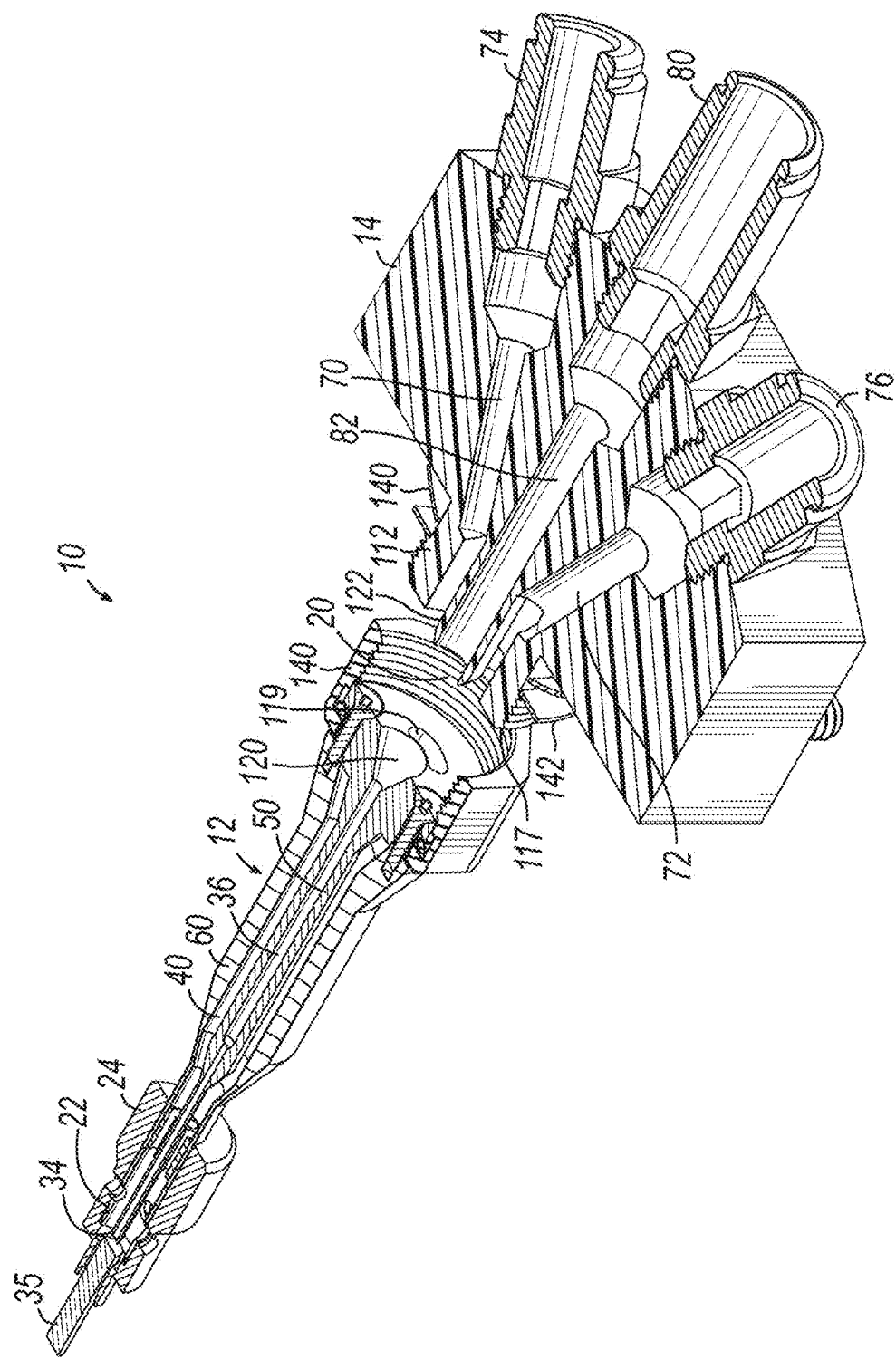
FIG. 3 is a cross sectional view taken along line 3-3 of FIG. 1.

As further illustrated in FIGS. 2, 2A and 3, the spray nozzle 12 further includes one or more vacuum return passages 40. In this example, the vacuum return passage 40 may be a generally annular passage in surrounding relation to the discharge passage 36. The housing body 19 may comprise any suitable design or configuration for defining the discharge passage 36 and one or more vacuum return passages 40. In the illustrative embodiment shown, for example, the discharge passage 36 is defined by an inner housing member 50, while the return passage 40 is defined between the inner housing member 50 and an outer housing member 60. The discharge and return passages 36, 40 may be of any design or configuration that may at least partially be defined by the inner and outer housing members 50, 60, respectively. Of course, the housing body 19 may be of any other design or configuration that incorporates suitable discharge and return passages. As illustrated, the return passage 40 may be located generally between the inner and outer housing members 50, 60, or may be contained in or otherwise integrated into other housing structure of the nozzle 12. The vacuum return passage(s) 40 are in fluid communication with a vacuum source (not shown) coupled to respective vacuum passages 70, 72 in the manifold coupled to outlet fittings 74, 76 (FIG. 3). A source of positively pressurized air, such as standard plant or shop air, is typically regulated to about 100 psi. This pressurized air may be suitably filtered and cleaned upstream of the system 10, and coupled to an inlet fitting 80 and supply passage 82 in the manifold 14. The supply passage 82 communicates with the central discharge passage 36 of the spray nozzle 12. The positively pressurized air may also be pressure and/or flow regulated upstream of the manifold 14.

FIG. 2 further illustrates a cleaning fluid injector 90 coupled to the manifold 14. The cleaning fluid injector 90 is coupled with the valve 16 and includes an outlet 92 communicating with the supply passage 82. A fluid tight seal is created with an O-ring 94. For the sake of clarity, the internal valve components are not shown in the drawings. The valve 16 receives positively pressurized cleaning fluid from a reservoir 18 (FIG. 1) and the valve 16 may be opened and closed to selectively inject a stream of cleaning fluid into the supply passage 82 in the manifold 14. When the cleaning fluid being injected through the outlet 92 of the injector 90 impacts the stream of air in passage 82, the cleaning fluid immediately atomizes within the supply passage 82. The cleaning fluid is injected at a 90° angle to the stream of incoming air in the passage 82, but may be injected at any appropriate angle. The pressure of the cleaning fluid is higher than the pressure of the air in the supply passage 82. This positively pressurized, atomized mixture of air and cleaning fluid travels through the central discharge passage 36 of the spray nozzle 12 and impacts against the end face 32a of the optical fiber 32 in the attached connector 30 (FIG. 2A). As shown by the arrows in FIG. 2A, after impacting the end face 32a, the cleaning fluid, air and any dirt, dust or other contaminants previously on the end face 32a return through the spray nozzle 12 by traveling in a reverse direction through the one or more vacuum return passages 40. A first fluid flow path 100 (FIG. 2A) at the discharge or second end portion 22 of the nozzle 12 couples the discharge passage 36 and the return passage(s) 40. As discussed below, vacuum return passage(s) 40 couple with the respective vacuum passages 70, 72 in the manifold 14 and ultimately exit the manifold 14 through the outlets 74, 76 (FIGS. 1 and 3) and suitable conduits (not shown) coupled to the outlets 74, 76. This mixture of air, cleaning fluid, and contaminants may be appropriately disposed of or reused, as desired.

Figure 4A:
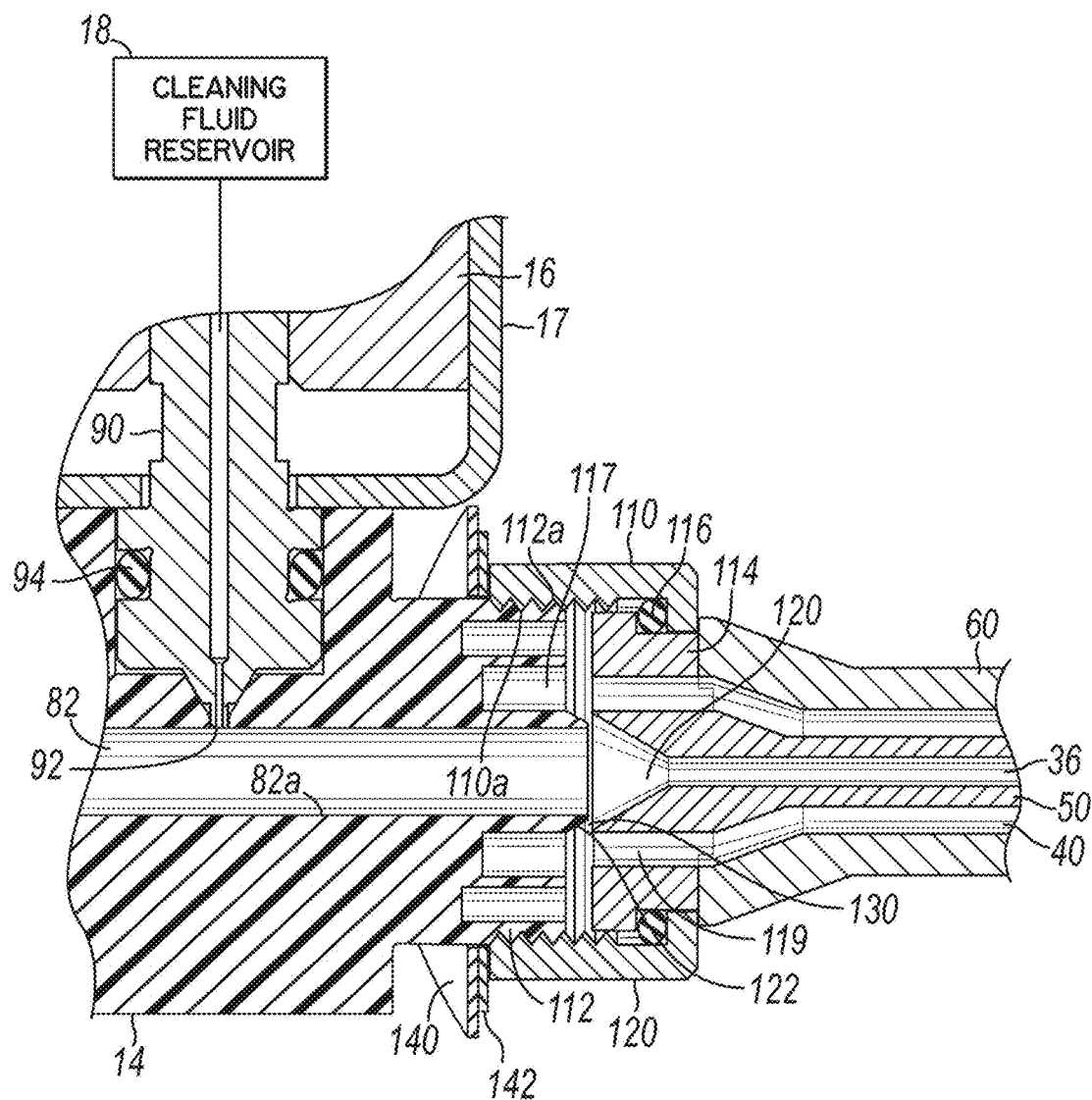
FIG. 4A is an enlarged cross sectional view of a portion of the assembled cleaning system shown in FIG. 1, illustrating a connection between the spray nozzle and a manifold of the cleaning system, and showing a gap formed generally between the spray nozzle and the manifold.

Still referring to FIGS. 1-3, but with additional focus on FIG. 4A, the spray nozzle 12 is coupled to the manifold 14 using a coupling element 110 such as a nut having internal threads 110a that engage external threads 112a of a coupling element 112 on the manifold 14. It will be appreciated that this configuration and these components may be changed and/or substituted with different coupling components that achieve similar functions for purposes of fluidly coupling a spray nozzle to a suitable manifold. A coupling end portion 114 of the spray nozzle 12 is connected to the nut 110 in a fluid-tight manner using a suitable gasket or O-ring 116 between the nut 110 and the coupling end portion 114 of the spray nozzle 12. The one or more vacuum return passages 40 in the spray nozzle 12 fluidly communicate with the vacuum passages 70, 72 in the manifold 14 via one or more ports 117, 119 respectively in the manifold fitting 112 and in the coupling end portion 114 after the nozzle 12 is coupled to the manifold 14, as shown. The threaded engagement between the nut 110 and the manifold fitting 112 provides a fluid seal to prevent unwanted leakage of fluid pressure from the spray nozzle 12 and/or manifold 14 at the nozzle/manifold junction.

Figure 4B:
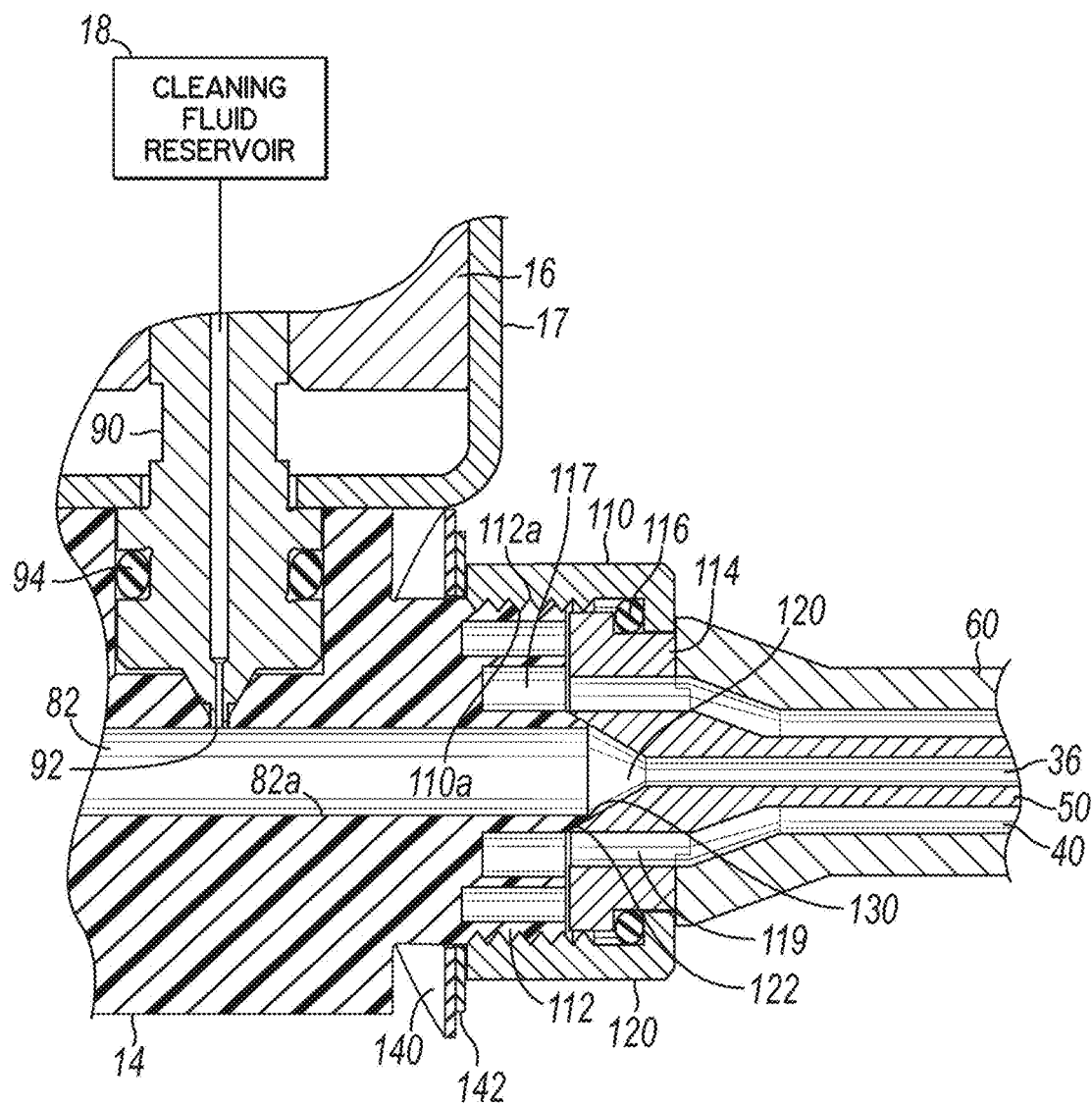
FIG. 4B is a cross sectional view similar to FIG. 4A, but illustrating the spray nozzle connected to the manifold with no gap.

FIG. 4A further illustrates that the internal structure of the spray nozzle 12 includes a beveled or tapered circular surface 120 and the manifold 14 includes a complementary beveled or tapered circular surface 122. More specifically, the tapered circular surface 120 of the nozzle is located on an inlet or first end portion of the inner housing member 50. The tapered circular surface 122 of the manifold 14 is adapted to engage or disengage the beveled or tapered surface 120 of the spray nozzle 12 to form a gap 130 as shown in FIG. 4A, or to form a seal as shown in FIG. 4B. In accordance with one illustrative aspect of the disclosure, FIG. 4A shows the ability to adjust the positioning between the spray nozzle 12 (e.g., the housing body 19) and the manifold 14 to form a gap 130 between the respective beveled surfaces 120, 122. This gap 130 may be annular and continuous, as shown, or may take on any other configuration such as one or more ports or passages. The gap 130 is an illustrative manner of providing a second fluid flow path between the positively pressurized passages 36, 82 of the manifold 14 and the spray nozzle 12 and the vacuum passages 40, 70, 72 of the spray nozzle 12 and manifold 14. In this manner, a portion of the positively pressurized, atomized cleaning fluid/air mixture is directed or diverted out of the manifold supply passage 82 generally at the first end portion 20 of the nozzle 12 through a communicating flow path (e.g., the gap 130) into the respective one or more vacuum passages 70, 72. This embodiment further provides a manner of adjusting the amount or mass of air and cleaning fluid mixture directed downstream through the central discharge passage 36 of the spray nozzle 12. This allows adjustment of the cleaning parameters associated with impacting the end face 32a of the optical fiber 32 with a positive pressurized flow of atomized cleaning fluid and air (FIG. 2A).

Another benefit of forming the gap as shown in FIG. 4A is that any contaminants that might be in the air and/or cleaning fluid tend to travel downstream along the inner surface 82a of the supply passage 82. Therefore, these contaminants will exit the supply passage 82 of the manifold 14 when they reach the gap 130 and will not travel further to the optical fiber end face 32a (FIG. 2A). In this embodiment, the gap 130 is formed by the nut 110 being tightened against one or more respective washers which may take on various configurations. Moreover, it will be appreciated that other manners of forming an adjustable gap or fluid communication path between the positive and vacuum flow passages may be used instead of the illustrative example shown and described herein. The embodiment shown uses, for example, a spring washer 140 abutting directly against the manifold 14 and at least one additional flat washer 142 positioned between the spring washer 140 and the nut 110. These washers 140, 142 surround the manifold coupling element or fitting 112. Other types of one or more spacer elements may be used or an entirely different manner of forming an adjustable gap or "controlled leak" between the positive pressure side and vacuum side of the system 10 may be used instead. The amount of tightening of the nut 110 determines how far the spray nozzle 12 is moved to the left (as shown in FIGS. 4A and 4B) and, therefore, how close the beveled surface 120 of the spray nozzle 12 is to the beveled surface 122 of the manifold 14. If tightened enough, as shown in FIG. 4B, the gap 130 is completely closed and a fluid tight seal is formed between the central positively pressurized passages 36, 82 and the radially outer vacuum or negatively pressurized passage 40, 70, 72. On the other hand, the gap 130 may be adjusted to be larger or smaller depending on the number of washers 140, 142, thickness(es)

thereof, or the design of other spacer element(s) used to fill the space between the nut 110 and the manifold 14. A larger gap 130 will allow additional amounts of positively pressurized air to be diverted out of the supply passage 82 generally at the first end portion 20 of the nozzle 12 and before reaching the optical fiber end face 32a and, therefore, less air/cleaning fluid mixture to reach the discharge end portion 22 of the nozzle 12 to impact the end face 32a, and vice versa.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope or spirit of the disclosure.

What is claimed is:

1. A spray nozzle for cleaning at least on optical fiber end face with a mixture of cleaning fluid and positively pressurized air, the spray nozzle configured to be coupled to an optical fiber connector that supports the at least one optical fiber end face, the spray nozzle comprising:
    a housing body having a first end portion and a second end portion, a discharge passage for carrying the mixture from the first end portion to a discharge opening in the second end portion, and a return passage extending at least partially in the second end portion;
    a manifold coupled to the first end portion of the housing body;
    wherein the return passage is configured to communicate with the discharge passage along a first fluid flow path proximate the second end portion for receiving the mixture after the mixture passes through the discharge opening; and
    wherein the return passage is configured to communicate with the discharge passage along a second fluid flow path proximate the first end portion, the second fluid flow path defined by a gap between the housing body and the manifold, and wherein the second fluid flow path is configured to divert a portion of the mixture from the discharge passage and thereby control an amount of the mixture being directed to the discharge opening.

2. The spray nozzle of claim 1, wherein the housing body further comprises:
    an inner housing member at least partially defining the discharge passage, and
    an outer housing member adjacent the inner housing member and at least partially defining the return passage.

3. The spray nozzle of claim 1, wherein the second fluid flow path is adjustable to allow an amount of the mixture diverted through the second fluid flow path to be changed and thereby further control an amount of positively pressurized air being directed to the discharge opening.

4. A system for cleaning at least one optical fiber end face with a mixture of positively pressurized air and a cleaning fluid, the system configured to be coupled to an optical fiber connector that supports the at least one optical fiber end face, the system comprising:
    a housing body having a first end portion and a second end portion, a discharge passage for carrying the mixture from the first end portion to a discharge opening in the second end portion, and a return passage extending at least partially in the second end portion; and
    a manifold coupled to the first end portion of the housing body; wherein:
        the return passage is configured to communicate with the discharge passage along a first fluid flow path proximate the second end portion for receiving the mixture after the mixture passes through the discharge opening, and
        the return passage is configured to communicate with the discharge passage along a second fluid flow path defined by a gap between the manifold and the housing body for diverting a portion of the mixture from the discharge passage and thereby control an amount of the mixture being carried by the discharge passage.

5. The system of claim 4, wherein the housing body includes a tapered surface, the manifold includes a complementary tapered surface relative to the tapered surface of the housing body, the complementary tapered surface confronting the tapered surface of the housing body, and the gap is formed between the tapered surface of the housing body and the complementary tapered surface of the manifold.

6. The system of claim 5, wherein a distance between the tapered surface of the housing body and the complementary tapered surface of the manifold is adjustable to vary the size of the gap.

7. The system of claim 4, wherein the gap is adjustable by movement of the housing body relative to the manifold.

8. The system of claim 4, wherein the housing body further comprises:
    an inner housing member at least partially defining the discharge passage, and
    an outer housing member adjacent the inner housing member and at least partially defining the return passage.

9. The system of claim 4, wherein the second fluid flow path is adjustable to allow an amount of the mixture diverted through the second fluid flow path to be changed and thereby further control an amount of positively pressurized air being directed to the discharge opening.

10. A system for cleaning at least one optical fiber end face with a mixture of positively pressurized air and a cleaning fluid, the system configured to be coupled to an optical fiber connector that supports the at least one optical fiber end face, the system comprising:
    a spray nozzle including:
        a housing body having a first end portion and a second end portion, a discharge passage for carrying the mixture from the first end portion to a discharge opening in the second end portion, and a return passage extending at least partially in the second end portion, and
        a spray nozzle coupling element at the first end portion; and
    a manifold including:
        a manifold coupling element configured to mate with the spray nozzle coupling element at the first end portion of the housing body,
        an air supply passage adapted to be coupled to a source of positively pressurized air, the supply passage communicating with the discharge passage of the housing body, and a vacuum passage adapted to be coupled to a source of vacuum pressure and communicating with the return passage of the housing body, wherein:

the return passage of the housing body is configured to communicate with the discharge passage along a first fluid flow path proximate the second end portion for receiving the mixture after the mixture passes through the discharge opening, and the return passage of the housing body is configured to communicate with the discharge passage along a second fluid flow path proximate the first end portion for diverting a portion of the mixture from the air supply passage of the manifold to the vacuum passage and thereby control an amount of the mixture being directed to the discharge opening.

11. The system of claim 10, wherein the housing body further comprises: an inner housing member at least partially defining the discharge passage, and an outer housing member adjacent the inner housing member and at least partially defining the return passage.

12. The system of claim 10, wherein the second fluid flow path is adjustable to allow an amount of the mixture diverted through the second fluid flow path to be changed and thereby further control the amount of the mixture being directed to the discharge opening.

13. The system of claim 10, wherein the second fluid flow path is defined by a gap formed at an interface between the spray nozzle coupling element and the manifold coupling element.

14. The system of claim 13, further comprising at least one spacer element positioned between the spray nozzle coupling element and the manifold, the at least one spacer element causing the gap to be formed when the spray nozzle coupling element is mated to the manifold coupling element.

15. The system of claim 13, wherein the housing body includes a tapered surface, the manifold comprises a complementary tapered surface relative to the tapered surface of the housing body, and the gap is formed between the tapered surface of the housing body and the complementary tapered surface of the manifold.

16. The system of claim 15, wherein a distance between the tapered surface of the housing body and the complementary tapered surface of the manifold is adjustable to vary the size of the gap.

17. The system of claim 13, wherein the size of the gap is adjustable by movement of the housing body relative to the manifold.

18. The system of claim 10, wherein the manifold further comprises a cleaning fluid inlet communicating with the supply passage for injecting the cleaning fluid into a stream of positively pressurized air flowing through the supply passage.

19. The system of claim 18, further comprising a reservoir configured to contain the cleaning fluid and communicating with the cleaning fluid inlet.

20. A method of removing contaminants from at least one optical fiber end face supported by an optical fiber connector using a spray nozzle having first and second end portions, the method comprising:

coupling the optical fiber connector to the second end portion of the spray nozzle such that the at least one optical fiber end face confronts a discharge opening of the spray nozzle wherein the discharge opening is located in the second end portion, and wherein the first end portion of the spray nozzle is coupled to a manifold;

directing a mixture of cleaning fluid and positively pressurized air through a discharge passage of the spray nozzle and at the at least one optical fiber end face, wherein the discharge passage carries the mixture from the first end portion to the discharge opening in the second end portion;

removing contaminants from the optical fiber end face with the mixture after the mixture passes through the discharge opening;

directing the mixture and removed contaminants proximate the second end portion into a return passage in the spray nozzle; and providing fluid communication between the discharge passage and the return passage along a fluid path defined by a gap between the spray nozzle and the manifold to divert a portion of the mixture from the discharge passage into the return passage and thereby control an amount of the mixture being directed to the discharge opening.

21. The method of claim 20, further comprising:

adjusting an amount of the mixture diverted from the discharge passage to further control an amount of the mixture being directed at the optical fiber end face.

22. The method of claim 20, further comprising:

forming the gap by placing at least a portion of at least one spacer element between the spray nozzle and the manifold.

23. The method of claim 20, further comprising:

adjusting the size of the gap by moving the spray nozzle relative to the manifold.

* * * * *

UNITED STATES PATENT AND TRADEMARK OFFICE
CERTIFICATE OF CORRECTION

| | | |
|---|---|---|
| PATENT NO. | : 11,766,702 B2 | Page 1 of 1 |
| APPLICATION NO. | : 17/126519 | |
| DATED | : September 26, 2023 | |
| INVENTOR(S) | : Keith Mitchell Hill et al. | |

It is certified that error appears in the above-identified patent and that said Letters Patent is hereby corrected as shown below:

In the Claims

In Column 7, Line 25, in Claim 1, delete "on" and insert -- one --.

In Column 10, Line 15, in Claim 20, delete "nozzle" and insert -- nozzle, --.

Signed and Sealed this
Third Day of September, 2024

*Katherine Kelly Vidal*

Katherine Kelly Vidal
*Director of the United States Patent and Trademark Office*